United States Patent
Jerichow et al.

(10) Patent No.: US 12,192,208 B2
(45) Date of Patent: Jan. 7, 2025

(54) APPARATUS, METHOD, AND COMPUTER PROGRAM OF PROTECTING COMMUNICATIONS BETWEEN NETWORKS USING PREDEFINED SECURITY PROFILES

(71) Applicant: Nokia Technologies Oy, Espoo (FI)

(72) Inventors: Anja Jerichow, Grafing bei München (DE); German Peinado Gomez, Warsaw (PL)

(73) Assignee: Nokia Technologies Oy, Espoo (FI)

(*) Notice: Subject to any disclaimer, the term of this patent is extended or adjusted under 35 U.S.C. 154(b) by 245 days.

(21) Appl. No.: 17/716,028

(22) Filed: Apr. 8, 2022

(65) Prior Publication Data

US 2022/0337597 A1 Oct. 20, 2022

(30) Foreign Application Priority Data

Apr. 16, 2021 (EP) .................................. 21168991

(51) Int. Cl.
*H04L 9/40* (2022.01)
(52) U.S. Cl.
CPC .......... *H04L 63/102* (2013.01); *H04L 63/205* (2013.01)
(58) Field of Classification Search
CPC .. H04L 63/102; H04L 63/0281; H04L 63/205
See application file for complete search history.

(56) References Cited

U.S. PATENT DOCUMENTS

| 10,313,875 B2* | 6/2019 | Jeong ..................... H04W 76/14 |
| 2019/0349340 A1* | 11/2019 | Zhang ...................... H04L 63/20 |
| 2021/0152539 A1* | 5/2021 | Xie ......................... H04L 9/3213 |
| 2021/0194933 A1* | 6/2021 | Ben Henda .......... H04W 12/033 |

OTHER PUBLICATIONS

"3rd Generation Partnership Project; Technical Specification Group Services and System Aspects; Security architecture and procedures for 5G system (Release 17)", 3GPP TS 33.501, V17.0.0, Dec. 2020, pp. 1-253.
"3rd Generation Partnership Project; Technical Specification Group Core Network and Terminals; 5G System; Public Land Mobile Network (PLMN) Interconnection; Stage 3 (Release 17)", 3GPP TS 29.573, V17.0.0, Mar. 2021, pp. 1-100.
"3rd Generation Partnership Project; Technical Specification Group Services and System Aspects; Study on enhanced security aspects of the 5G Service Based Architecture (SBA); (Release 17)", 3GPP TR 33.875, V0.2.0, Mar. 2021, pp. 1-20.

(Continued)

*Primary Examiner* — Hieu T Hoang
(74) *Attorney, Agent, or Firm* — Duft & Bornsen, PC

(57) ABSTRACT

An apparatus comprises means for: causing information indicating a first security protocol profile of a first security protocol from a first security node of a first network to be sent from a first security node of a first network to a second security node of a second network, wherein the first security profile has one or more of: a modification policy; a data type policy; and a cipher suite; and causing the first security node to communicate with the second security node in accordance with the first security profile.

20 Claims, 6 Drawing Sheets

(56) References Cited

OTHER PUBLICATIONS

Extended European Search Report received for corresponding European Patent Application No. 21168991.4, dated Sep. 29, 2021, 8 pages.
"N32 interface", 3GPP TSG-SA3 Meeting #100e, S3-201796, Nokia, Aug. 17-28, 2020, 22 pages.
"Misalignment between TS 33.501 and TS 29.573 on N32-f context ID", 3GPP TSG-CT WG4 Meeting #96, C4-200558, Agenda: 6.3.2, Nokia, Feb. 24-28, 2020, 4 pages.
"Clarification for N32 security", 3GPP TSG-SA WG3 Meeting #95, S3-191617, Ericsson, May 6-10, 2019, 8 pages.
"Corrections to PRINS call flows", 3GPP TSG-CT WG4 Meeting #99e, C4-204187, Nokia, Aug. 18-28, 2020, 12 pages.

* cited by examiner

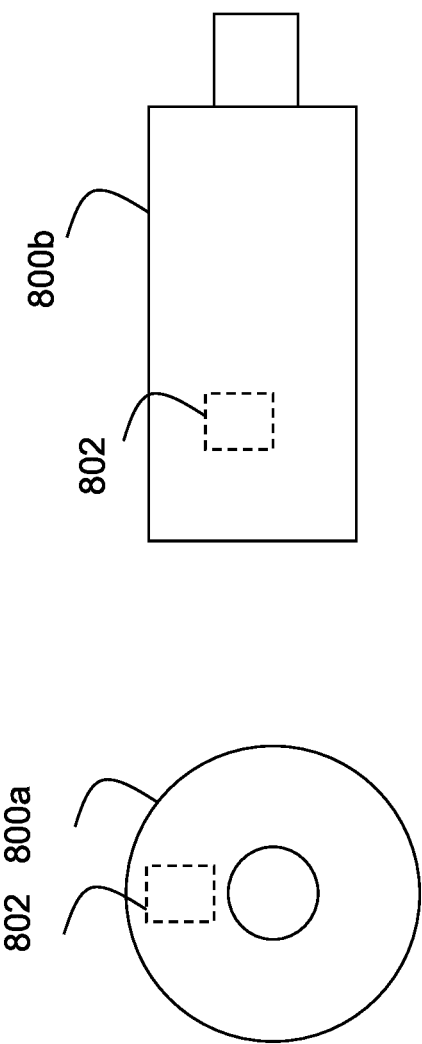

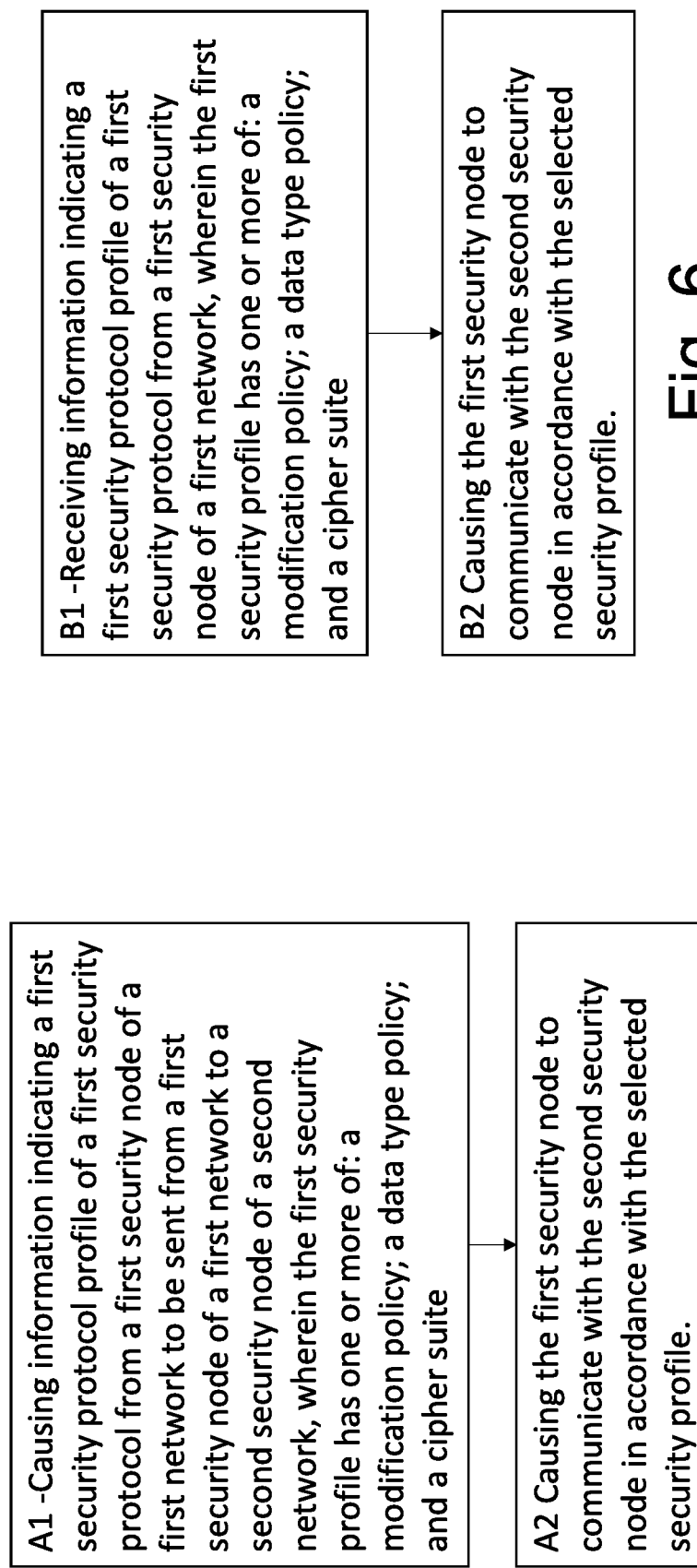

APPARATUS, METHOD, AND COMPUTER PROGRAM OF PROTECTING COMMUNICATIONS BETWEEN NETWORKS USING PREDEFINED SECURITY PROFILES

FIELD OF THE DISCLOSURE

The present disclosure relates to an apparatus, a method, and a computer program and in particular but not exclusively to a method, apparatus, and computer program for supporting communications between different networks.

BACKGROUND

A communication system can be seen as a facility that enables communication sessions between two or more entities such as user equipment (UE), base stations/access points and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of a UE. A UE is provided with an appropriate signal receiving and transmitting apparatus for enabling communications, for example enabling access to a communication network or communications directly with other users. The UE may access a carrier provided by a station or access point and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture is known as the long-term evolution (LTE) or the Universal Mobile Telecommunications System (UMTS) radio-access technology. Another example communication system is the so called 5G radio or new radio (NR) access technology. Communications between different communication networks may be supported.

SUMMARY

According to some embodiments, there is provided an apparatus comprising means for: causing information indicating a first security protocol profile of a first security protocol from a first security node of a first network to be sent from a first security node of a first network to a second security node of a second network, wherein the first security profile has one or more of: a modification policy; a data type policy; and a cipher suite; and causing the first security node to communicate with the second security node in accordance with the first security profile.

A plurality of different security protocol profiles of the first security protocol may be provided including the first security profile, wherein each of the plurality of security protocol profiles is associated with one or more of: a modification policy; a data type policy; and a cipher suite.

The means may be for selecting the first security profile from the plurality of different security profiles based on a priority order, the priority order being defined by one or both of the first and second security nodes.

The means may be for causing information indicating the plurality of security profiles to be sent from the first security node to the second security node, the information indicating the plurality of security profiles including the information indicating the first security protocol profile.

The means may be for receiving information indicating which of the plurality of security profiles of the first security protocol are supported by the second security node, and in response selecting the first security profile.

The means may be for, prior to causing information indicating the first security protocol profile to be sent, receiving information indicating which of the plurality of security profiles of the first security protocols are supported by the second security node, and in response selecting the first security profile.

The means may be for causing information indicating the first security protocol to be sent to the second security node, and in response, receiving said information indicating which of the plurality of security profiles of the first security protocol are supported by the second security node.

The means may be for causing the information indicating the first security profile to be sent from the first security node to the second security node via a control channel.

The means may be for causing the information indicating the first security profile to be sent from the first security node to the second security node via a control channel in a handshake procedure.

The means may be for causing the first security node to communicate with the second security node in accordance with the first security profile on a data channel.

Context information for the data channel may comprise information indicating the security profile.

The means may be for providing information indicating the first security profile to one or more intermediate internet protocol exchange service nodes.

The first security profile may indicate one or more capabilities of the security node supporting that first security profile.

The first security profile may comprise information indicating a trust level.

A security profile may comprise information indicating a trust level.

The modification policy may indicate which information elements can be modified by one or more intermediate nodes between the first and second security nodes.

The data type policy may indicate which type of data is encrypted by one or both of the first and second security nodes.

The means may be for storing information about the first security profile and optionally one or more other security profiles.

The first security protocol may comprise a protocol for N32 interconnect security.

One or both of the first and second security nodes comprise a security edge proxy.

The apparatus may be the first security node or provided in first security node.

According to some embodiments, there is provided an apparatus comprising means for: receiving information indicating a first security protocol profile of a first security protocol from a first security node of a first network, wherein the first security profile has one or more of: a modification policy; a data type policy; and a cipher suite; and causing a second security node of a second network to communicate with the first security node in accordance with the selected security profile.

The means may be for receiving a request from the first security node requesting information about one or more security protocol profiles supported by the second security node, and in response, causing information about one or more security profiles supported by the second security node to be sent to the first security node.

A plurality of different security protocol profiles of the first security protocol may be provided including the first security profile, wherein each of the plurality of security protocol profiles is associated with one or more of: a modification policy; a data type policy; and a cipher suite.

The means may be for providing a priority order associated with the plurality of different security profiles based on a priority order to the first security node.

The means may be for receiving information indicating the plurality of security profiles supported by the first security nodes.

The means may be for causing information indicating which of the plurality of security profiles of the first security protocol are supported by the second security node to be sent to the first security node.

The means may be for receiving information indicating the first security protocol from the first security node, and in response, causing information indicating which of the plurality of security profiles of the first security protocol are supported by the second security node to be sent to the first security node.

The means may be for receiving the information indicating the first security profile from the first security node via a control channel.

The means may be for receiving the information indicating the first security profile from the first security node via a control channel in a handshake procedure.

The means may be for causing the second security node to communicate with the first security node in accordance with the first security profile on a data channel.

Context information for the data channel may comprise information indicating the security profile.

The means may be for providing information indicating the first security profile to one or more intermediate internet protocol exchange service nodes.

The first security profile may indicate one or more capabilities of the security node supporting that first security profile.

The first security profile may comprise information indicating a trust level.

A security profile may comprise information indicating a trust level.

The modification policy may indicate which information elements can be modified by one or more intermediate nodes between the first and second security nodes.

The data type policy may indicate which type of data is encrypted by one or both of the first and second security nodes.

The means may be for storing information about the first security profile and optionally one or more other security profiles.

The first security protocol may comprise a protocol for N32 interconnect security.

One or both of the first and second security nodes may comprise a security edge proxy.

The apparatus may be the second security node or provided in second security node.

According to an aspect there is provided an apparatus comprising at least one processor and at least one memory including computer code for one or more programs, the at least one memory and the computer code configured, with the at least one processor, to cause the apparatus at least to: cause information indicating a first security protocol profile of a first security protocol from a first security node of a first network to be sent from a first security node of a first network to a second security node of a second network, wherein the first security profile has one or more of: a modification policy; a data type policy; and a cipher suite; and cause the first security node to communicate with the second security node in accordance with the first security profile.

A plurality of different security protocol profiles of the first security protocol may be provided including the first security profile, wherein each of the plurality of security protocol profiles is associated with one or more of: a modification policy; a data type policy; and a cipher suite.

The at least one memory and the computer code may be configured, with the at least one processor, to cause the apparatus at least to: select the first security profile from the plurality of different security profiles based on a priority order, the priority order being defined by one or both of the first and second security nodes.

The at least one memory and the computer code may be configured, with the at least one processor, to cause the apparatus at least to: cause information indicating the plurality of security profiles to be sent from the first security node to the second security node, the information indicating the plurality of security profiles including the information indicating the first security protocol profile.

The at least one memory and the computer code may be configured, with the at least one processor, to cause the apparatus at least to: receive information indicating which of the plurality of security profiles of the first security protocol are supported by the second security node, and in response selecting the first security profile.

The at least one memory and the computer code may be configured, with the at least one processor, to cause the apparatus at least to: prior to causing information indicating the first security protocol profile to be sent, receive information indicating which of the plurality of security profiles of the first security protocols are supported by the second security node, and in response selecting the first security profile.

The at least one memory and the computer code may be configured, with the at least one processor, to cause the apparatus at least to: cause information indicating the first security protocol to be sent to the second security node, and in response, receiving said information indicating which of the plurality of security profiles of the first security protocol are supported by the second security node.

The at least one memory and the computer code may be configured, with the at least one processor, to cause the apparatus at least to: cause the information indicating the first security profile to be sent from the first security node to the second security node via a control channel.

The at least one memory and the computer code may be configured, with the at least one processor, to cause the apparatus at least to: cause the information indicating the first security profile to be sent from the first security node to the second security node via a control channel in a handshake procedure.

The at least one memory and the computer code may be configured, with the at least one processor, to cause the apparatus at least to: cause the first security node to communicate with the second security node in accordance with the first security profile on a data channel.

Context information for the data channel may comprise information indicating the security profile.

The at least one memory and the computer code may be configured, with the at least one processor, to cause the apparatus at least to: provide information indicating the first security profile to one or more intermediate internet protocol exchange service nodes.

The first security profile may indicate one or more capabilities of the security node supporting that first security profile.

The first security profile may comprise information indicating a trust level.

A security profile may comprise information indicating a trust level.

The modification policy may indicate which information elements can be modified by one or more intermediate nodes between the first and second security nodes.

The data type policy may indicate which type of data is encrypted by one or both of the first and second security nodes.

The at least one memory and the computer code may be configured, with the at least one processor, to cause the apparatus at least to: store information about the first security profile and optionally one or more other security profiles.

The first security protocol may comprise a protocol for N32 interconnect security.

One or both of the first and second security nodes comprise a security edge proxy.

The apparatus may be the first security node or provided in first security node.

According to an aspect there is provided an apparatus comprising at least one processor and at least one memory including computer code for one or more programs, the at least one memory and the computer code configured, with the at least one processor, to cause the apparatus at least to: receive information indicating a first security protocol profile of a first security protocol from a first security node of a first network, wherein the first security profile has one or more of: a modification policy; a data type policy; and a cipher suite; and cause a second security node of a second network to communicate with the first security node in accordance with the selected security profile.

The at least one memory and the computer code may be configured, with the at least one processor, to cause the apparatus at least to: receiving a request from the first security node requesting information about one or more security protocol profiles supported by the second security node, and in response, causing information about one or more security profiles supported by the second security node to be sent to the first security node.

A plurality of different security protocol profiles of the first security protocol may be provided including the first security profile, wherein each of the plurality of security protocol profiles is associated with one or more of: a modification policy; a data type policy; and a cipher suite.

The at least one memory and the computer code may be configured, with the at least one processor, to cause the apparatus at least to: provide a priority order associated with the plurality of different security profiles based on a priority order to the first security node.

The at least one memory and the computer code may be configured, with the at least one processor, to cause the apparatus at least to: receive information indicating the plurality of security profiles supported by the first security nodes.

The at least one memory and the computer code may be configured, with the at least one processor, to cause the apparatus at least to: cause information indicating which of the plurality of security profiles of the first security protocol are supported by the second security node to be sent to the first security node.

The at least one memory and the computer code may be configured, with the at least one processor, to cause the apparatus at least to: receive information indicating the first security protocol from the first security node, and in response, causing information indicating which of the plurality of security profiles of the first security protocol are supported by the second security node to be sent to the first security node.

The at least one memory and the computer code may be configured, with the at least one processor, to cause the apparatus at least to: receive the information indicating the first security profile from the first security node via a control channel.

The at least one memory and the computer code may be configured, with the at least one processor, to cause the apparatus at least to: receive the information indicating the first security profile from the first security node via a control channel in a handshake procedure.

The at least one memory and the computer code may be configured, with the at least one processor, to cause the apparatus at least to: cause the second security node to communicate with the first security node in accordance with the first security profile on a data channel.

Context information for the data channel may comprise information indicating the security profile.

The at least one memory and the computer code may be configured, with the at least one processor, to cause the apparatus at least to: provide information indicating the first security profile to one or more intermediate internet protocol exchange service nodes.

The first security profile may indicate one or more capabilities of the security node supporting that first security profile.

The first security profile may comprise information indicating a trust level.

A security profile may comprise information indicating a trust level.

The modification policy may indicate which information elements can be modified by one or more intermediate nodes between the first and second security nodes.

The data type policy may indicate which type of data is encrypted by one or both of the first and second security nodes.

The at least one memory and the computer code may be configured, with the at least one processor, to cause the apparatus at least to: store information about the first security profile and optionally one or more other security profiles.

The first security protocol may comprise a protocol for N32 interconnect security.

One or both of the first and second security nodes may comprise a security edge proxy.

The apparatus may be the second security node or provided in second security node.

According to some embodiments, there is provided a method comprising: causing information indicating a first security protocol profile of a first security protocol from a first security node of a first network to be sent from a first security node of a first network to a second security node of a second network, wherein the first security profile has one or more of: a modification policy; a data type policy; and a cipher suite; and causing the first security node to communicate with the second security node in accordance with the first security profile.

A plurality of different security protocol profiles of the first security protocol may be provided including the first security profile, wherein each of the plurality of security protocol profiles is associated with one or more of: a modification policy; a data type policy; and a cipher suite.

The method may comprise selecting the first security profile from the plurality of different security profiles based on a priority order, the priority order being defined by one or both of the first and second security nodes.

The method may comprise causing information indicating the plurality of security profiles to be sent from the first security node to the second security node, the information indicating the plurality of security profiles including the information indicating the first security protocol profile.

The method may comprise receiving information indicating which of the plurality of security profiles of the first security protocol are supported by the second security node, and in response selecting the first security profile.

The method may comprise, prior to causing information indicating the first security protocol profile to be sent, receiving information indicating which of the plurality of security profiles of the first security protocols are supported by the second security node, and in response selecting the first security profile.

The method may comprise causing information indicating the first security protocol to be sent to the second security node, and in response, receiving said information indicating which of the plurality of security profiles of the first security protocol are supported by the second security node.

The method may comprise causing the information indicating the first security profile to be sent from the first security node to the second security node via a control channel.

The method may comprise causing the information indicating the first security profile to be sent from the first security node to the second security node via a control channel in a handshake procedure.

The method may comprise causing the first security node to communicate with the second security node in accordance with the first security profile on a data channel.

Context information for the data channel may comprise information indicating the security profile.

The method may comprise providing information indicating the first security profile to one or more intermediate internet protocol exchange service nodes.

The first security profile may indicate one or more capabilities of the security node supporting that first security profile.

The first security profile may comprise information indicating a trust level.

A security profile may comprise information indicating a trust level.

The modification policy may indicate which information elements can be modified by one or more intermediate nodes between the first and second security nodes.

The data type policy may indicate which type of data is encrypted by one or both of the first and second security nodes.

The method may comprise storing information about the first security profile and optionally one or more other security profiles.

The first security protocol may comprise a protocol for N32 interconnect security.

One or both of the first and second security nodes comprise a security edge proxy.

The method may be performed by an apparatus. The apparatus may be the first security node or provided in first security node.

According to some embodiments, there is provided a method comprising: receiving information indicating a first security protocol profile of a first security protocol from a first security node of a first network, wherein the first security profile has one or more of: a modification policy; a data type policy; and a cipher suite; and causing a second security node of a second network to communicate with the first security node in accordance with the selected security profile.

The method may comprise receiving a request from the first security node requesting information about one or more security protocol profiles supported by the second security node, and in response, causing information about one or more security profiles supported by the second security node to be sent to the first security node.

A plurality of different security protocol profiles of the first security protocol may be provided including the first security profile, wherein each of the plurality of security protocol profiles is associated with one or more of: a modification policy; a data type policy; and a cipher suite.

The method may comprise providing a priority order associated with the plurality of different security profiles based on a priority order to the first security node.

The method may comprise receiving information indicating the plurality of security profiles supported by the first security nodes.

The method may comprise causing information indicating which of the plurality of security profiles of the first security protocol are supported by the second security node to be sent to the first security node.

The method may comprise receiving information indicating the first security protocol from the first security node, and in response, causing information indicating which of the plurality of security profiles of the first security protocol are supported by the second security node to be sent to the first security node.

The method may comprise receiving the information indicating the first security profile from the first security node via a control channel.

The method may comprise receiving the information indicating the first security profile from the first security node via a control channel in a handshake procedure.

The method may comprise causing the second security node to communicate with the first security node in accordance with the first security profile on a data channel.

Context information for the data channel may comprise information indicating the security profile.

The method may comprise providing information indicating the first security profile to one or more intermediate internet protocol exchange service nodes.

The first security profile may indicate one or more capabilities of the security node supporting that first security profile.

The first security profile may comprise information indicating a trust level.

A security profile may comprise information indicating a trust level.

The modification policy may indicate which information elements can be modified by one or more intermediate nodes between the first and second security nodes.

The data type policy may indicate which type of data is encrypted by one or both of the first and second security nodes.

The method may comprise storing information about the first security profile and optionally one or more other security profiles.

The first security protocol may comprise a protocol for N32 interconnect security.

One or both of the first and second security nodes may comprise a security edge proxy.

The method may be performed by an apparatus. The apparatus may be the second security node or provided in second security node.

According to an aspect there is provided a computer program comprising computer executable code which when run on at least one processor is configured to cause at least one of the above methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which:

FIG. 4 shows a schematic representation of a non-volatile memory medium storing instructions which when executed by a processor allow a processor to perform one or more of the steps of the methods of FIGS. 5 and 6;

FIG. 5 show a method of some embodiments; and

FIG. 6 shows another method of some embodiments.

DETAILED DESCRIPTION OF THE FIGURES

In the following, certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1a, 1b and 2 to assist in understanding the technology underlying the described examples.

Figure 1A:
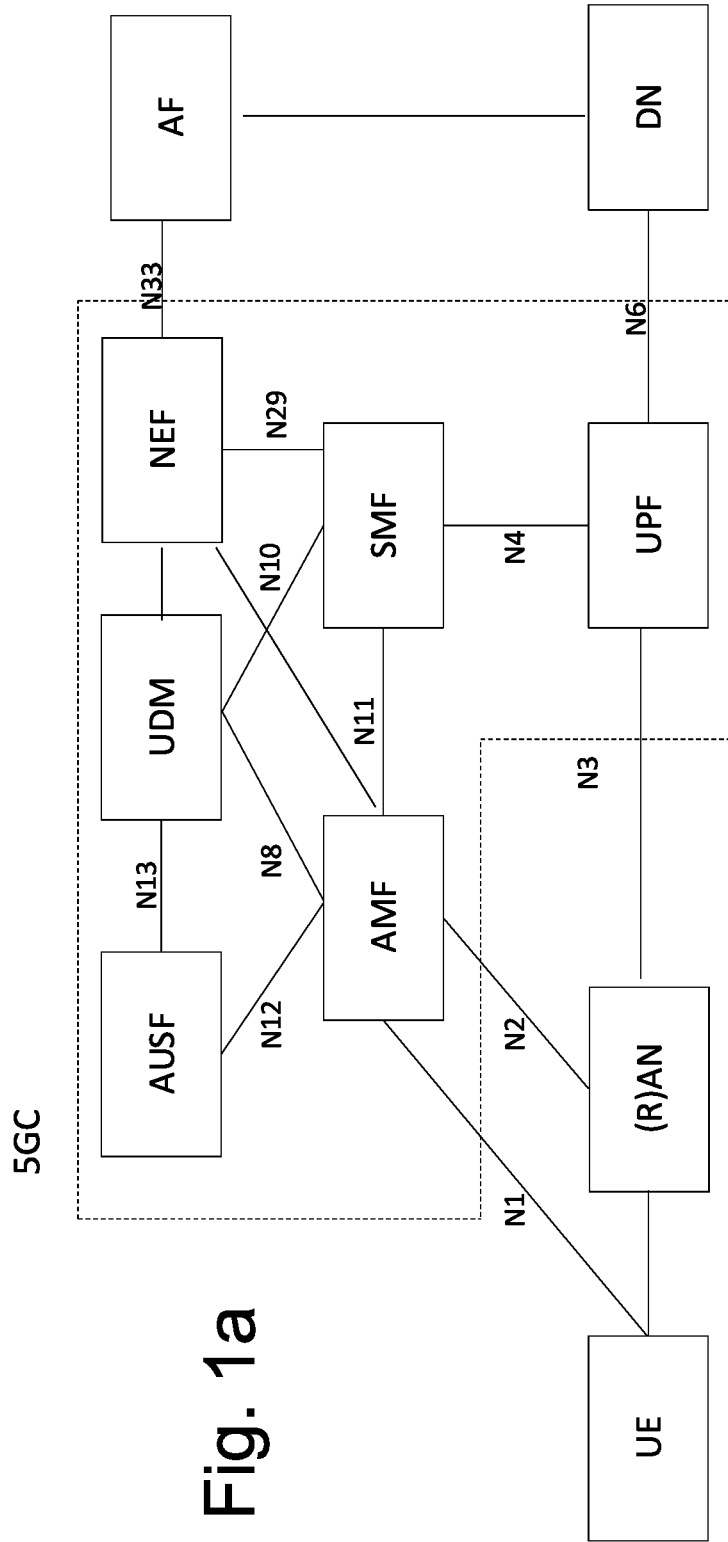
FIG. 1a shows a schematic representation of a 5G system.

FIG. 1a shows a schematic representation of a 5G system (5GS). The 5GS may comprise user equipment (UE), a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF) and/or a network exposure function (NEF). Although not illustrated the 5GC may comprise other network functions (NF).

Figure 1B:
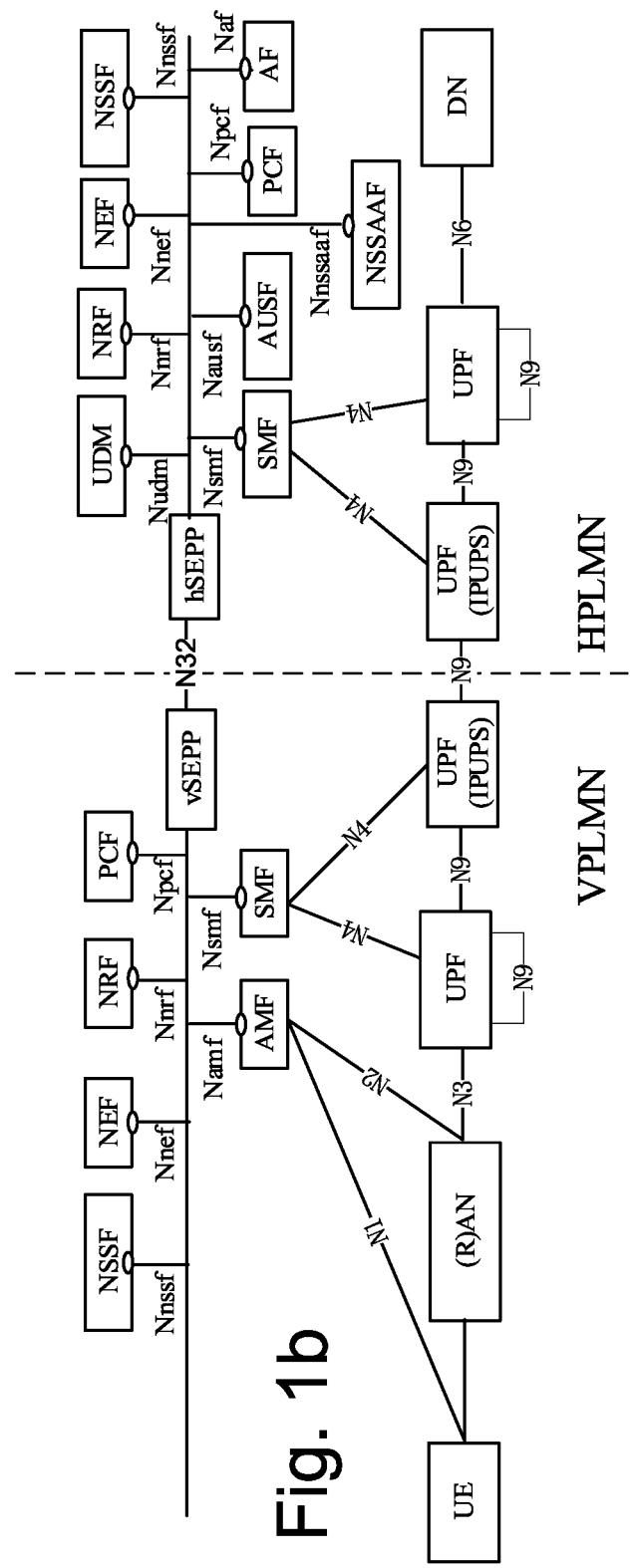
FIG. 1b shows a schematic representation of a 5G system having a home network and a visiting network.

The arrangement of FIG. 1b shows a schematic representation of a 5G system with a home network and a visiting network. It should be appreciated that some of the elements of the home network and the visiting network have been omitted for clarity.

The home network—HPLMN (home public land mobile network) is shown with the UPF, AUSF, SMF, UDM, AF, NEF, and DN. The visiting network—VPLMN (visited public land mobile network) is shown with the UE, RAN, UPF, AMF, SMF and NEF. Additionally both the HPLMN and VLMN have an NSSF (network slice function), an NRF (network repository function) and a PCF (policy control function).

The VPLMN may comprise a visited security edge proxy vSEPP. The HPLMN may comprise home security edge proxy hSEPP. The vSEPP and the hSEPP may communicate via one or more IPX (internet protocol exchange service) nodes. The SEPPs and IPX will be described in more detail later.

Figure 2:
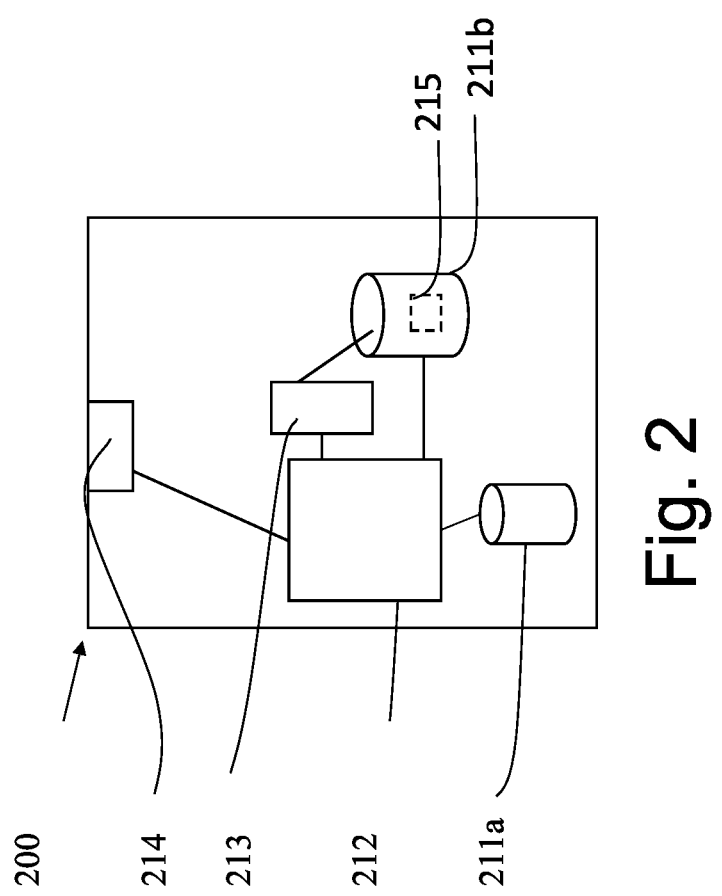
FIG. 2 shows a schematic representation of an apparatus.

FIG. 2 illustrates an example of an apparatus 200. The apparatus may be provided in a SEPP or a IPX node. The apparatus may comprise at least one memory. The at least one memory may comprise at least one random access memory (RAM) 211a and/or at least one read only memory (ROM) 211b. The apparatus may comprise at least one processor 212, 213. The apparatus may comprise an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b.

In 5G, network functions (NFs) may communicate with each other. In the scenario where the two communicating NFs are in two different public land mobile networks (PLMNs), communication happens over a roaming interface between the two participating PLMNs. In this regard, reference is made to FIG. 3.

To protect NF specific content in the messages that are sent over the roaming interface, each 5G PLMN has a SEPP as the entity sitting at the perimeter of the PLMN network and acting as a gateway. This gateway protects the 5G Core, the services provided by the 5G system, and the subscribers consuming those services, inspecting the outgoing and incoming traffic of/to the network, and enforcing the corresponding policies. The SEPPs use TLS, when they are in direct communication, or they implement application layer security for data exchanged between two inter-network NFs over an N32 roaming interface at the service layer, when data is passing via intermediary nodes, for example IPX. Two types of connections are used between the communicating SEPPs:

a) An N32-c connection for control plane messages—this is an end-to-end (e2e) Transport Layer Security (TLS) based connection, with one SEPP being the client and the other SEPP acting as the server. The N32-c interface may allow an initial handshake procedure between the SEPP in a first PLMN (called the initiating SEPP) and the SEPP in a second PLMN (called the responding SEPP). If no intermediary node, for example IPX, is between the SEPPs, TLS may also be negotiated for N32-f. Otherwise, N32-f protocol is PRINS and thus, N32-c may involve capability negotiation and parameter exchange for N32-f. This may be as for example specified in 3GPP TS 33.501.

In case of PRINS, the N32-c connection may be used for the following purposes:

Key agreement: The SEPPs independently export keying material associated with the first N32-c connection between them and use it as the pre-shared key for generating the shared session key required.

Parameter exchange: The SEPPs exchange security related configuration parameters that they use to protect HTTP (hypertext transfer protocol) messages exchanged between the two Network Functions (NF) in their respective networks.

Error handling: The receiving SEPP sends an error signalling message to the peer SEPP when it detects an error on the N32-f interface.

The following security related configuration parameters may be exchanged between the two SEPPs for configuration of N32-f in PRINS:

a. Modification policy. A modification policy indicates which IEs (information elements) can be modified by an IPX provider of the sending SEPP.

b. Data-type encryption policy. A data-type encryption policy indicates which types of data will be encrypted by the sending SEPP.

c. Cipher suites for confidentiality and integrity protection, when application layer security is used to protect HTTP messages between them.

d. N32-f context ID. N32-f context ID identifies the set of security related configuration parameters applicable to a protected message received from a SEPP in a different PLMN.

b) An N32-f connection for request/response messages—this is a logical e2e (end to end) connection between two SEPPs and is used to send and receive HTTP messages carrying the request/response messages as payload. The request/response messages may be protected messages. The request/response messages may be protected Restful API (application programming interface) request/response messages. PRINS (PRotocol for N32 INterconnect Security) may be used on the N32-f interface.

Figure 3:
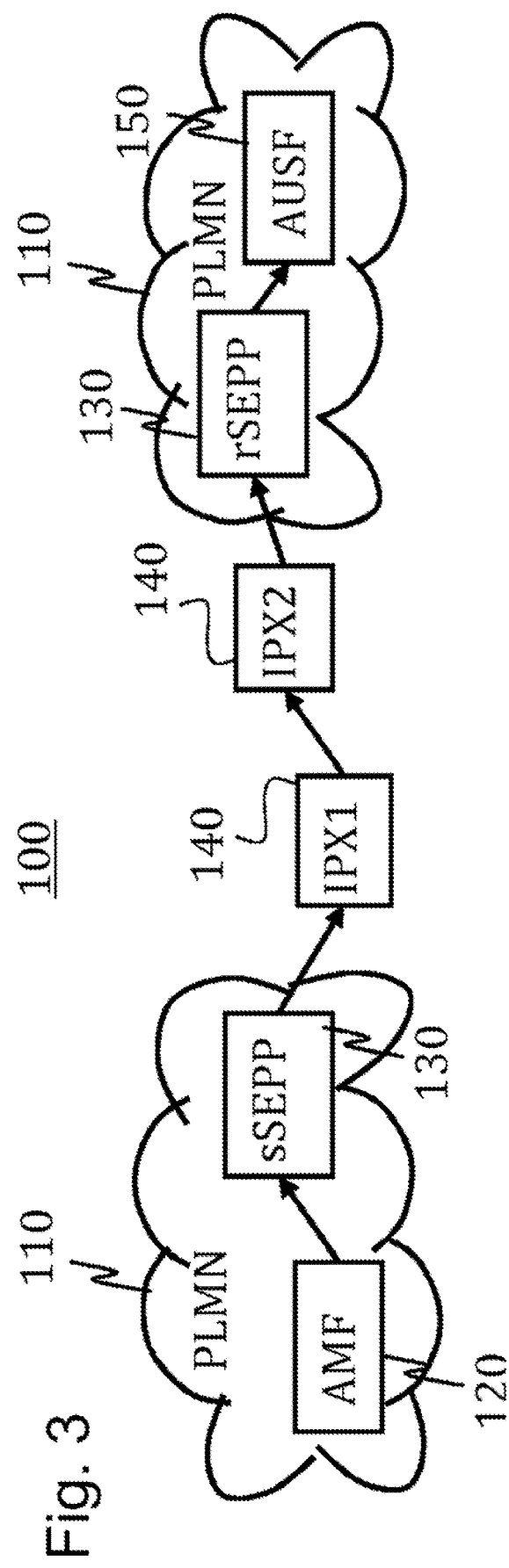
FIG. 3 shows a having a home network and a visiting network with intermediate nodes.

FIG. 3 shows simplified diagram of a system 100 of an example embodiment. FIG. 3 shows two PLMNs 110 equipped with a first network function 120 that in a sending case is, for example, an AMF. In some embodiments, the network function may be a different function to the AMF. The PLMNs each further comprise a security edge proxy (SEPP) 130. The SEPP of one PLMN acts as a sending SEPP 130 or sSEPP and another one as a receiving SEPP 130 or rSEPP for one message. The SEPP 130 is a network node at the boundary of an operator's network that receives a message from the network function AMF 120, applies protection for sending, and forwards the reformatted message through a chain of intermediate nodes such as IP (internet protocol) exchanges (IPX) 140 towards the rSEPP 130. The message may be messages such as an HTTP request or HTTP response.

The rSEPP 130 receives a message sent by the sSEPP and forwards the message towards a second network function within its operator's network, e.g. an AUSF 150 or other network function. The message can alternatively be sent towards any other network function of the second network. In some cases, two SEPPs 130 also communicate with each other, e.g., regarding their mutual connections. The network shown with the AMF may be the VPLMN and the network shown with the AUSF may be the HPLM.

The intermediate node 140 is, for example, a network node outside the operator's network. In the example shown here, there are two IPX nodes. However, in other embodiments, there may be more or less than two IP nodes. In some embodiments, the entities between the two SEPPs of the two domains may be regarded as an IPX network.

A SEPP 130 may provide a receiving function and/or a sending function.

The formed N32-c connection enables control plane request/response type messaging from the client to the server side of the TLS connection.

PRINS may be used for protection of communications between the SEPPs. PRINS may be used where there are IPX entities between the SEPPs.

The SEPP sits at the perimeter of the network and performs application layer security on the HTTP message before it is sent externally over the roaming interface.

The application layer traffic comprises all the IEs in the HTTP message payload, sensitive information in HTTP message header and request URI (uniform resource identifier). Not all the IEs may get the same security treatment in SEPP. Some IEs require e2e encryption, some may only require e2e integrity protection, while other IEs may require e2e integrity protection but are modifiable by an intermediate IPX provider while in-transit.

In the example of FIG. 3, the AMF NF in a one PLM network invokes an API request on the AUSF NF in the other PLM network using the following message flow:

The AMF NF first sends the HTTP request message to its local SEPP (i.e. sSEPP).

The sSEPP applies application layer security (PRINS) and sends the secure message on the N32 interface to AUSF NF of the other PLMN.

The rSEPP at the edge of the other PLMN, receives all incoming HTTP messages from its roaming partners. It verifies the message, removes the protection mechanism applied at the application layer, and forwards the resulting HTTP message to the corresponding AUSF NF.

To allow for the trusted intermediary IPX nodes to see and possibly modify specific IEs in the HTTP message, while completely protecting all sensitive information end to end between SEPPs, the SEPP may implement application layer security in such a way that:

sensitive information, such as authentication vectors, are fully e2e confidentiality protected between two SEPPs. This ensures that no node in the IPX network is able to view such information while in-transit;

IEs that are subject to modification by intermediary IPX nodes are integrity protected and can only be modified in a verifiable way by authorized IPX nodes; and the receiving SEPP can detect modification by unauthorized IPX nodes.

The required negotiation on security configuration parameters and information elements to be protected for N32-f (forwarding) has been considered by the industry to be too cumbersome in some scenarios. This may be for example because of operational complexity for an IPX vendor to evaluate received JSON (JavaScript object notation) objects and execute the various policy options which a SEPP may have negotiated beforehand.

Some embodiments may provide templates or profiles. The templates may be provided as security profiles which may be used for PRINS. This may at least partially mitigate or address some of the PRINS operational issues which may be considered to be problematic. This may overcome some constraints around the complexity of the current standardized PRINS mechanism.

Some embodiments may aim to simplify N32-f usage when PRINS is used for at least some cases. This may support some business and operations operational requirements associated with the protocol suite.

Where PRINS is selected as the protocol to be used in the N32-f interface, a parameter exchange procedure is executed on the N32-c interface. The parameter exchange procedure is performed to agree on cipher suites and/or to exchange protection policies.

In some embodiments, an option is provided such that peer operators do not need to negotiate on particular modification policies and/or or data-type encryption policies and/or on cipher suites. Rather, in some embodiments, a given profile will be associated with one or more characteristics. The one or more characteristics may comprise one or more pre-selected cipher suites, one or more default modification policies and/or one or more default data-type encryption policies. There may be a plurality of different profiles. Different ones of the profiles may be associated with different characteristics. When a profile is selected, the associated policies are used.

This may be combined with a list of IEs to be protected as well as an indication for trust level.

The respective profile, which is to be used, is communicated to the SEPPs communicating with each other and to the IPX providers (or even a roaming hub).

Thus, in some embodiments, the N32-c negotiation for PRINS may be provided with an indication for a PRINS profile. Instead of negotiation of a cipher-suite and exchange of protection policies, some embodiments may use a profile indicator. The profile indicator may refer to the security profile that is needed between the two SEPPs. The profiled indication may be propagated as an indication of the selected PRINS profile to the IPX.

Some embodiments provide a handshake for N32-c and will provide an additional element for this purpose.

In some embodiments, the parameter exchange procedure may be executed if the security capability negotiation procedure selected the security capability as PRINS.

The parameter exchange procedure is performed to:

If PRINS without a profile is chosen:

Agree on a cipher suite to use for protecting NF service related signalling over N32-f.

Optionally, exchange the protection policies to use for protecting NF service related signalling over N32.

If PRINS with a profile is chosen:

Follow the PRINS profile where the PRINS profile has been indicated during the security capability negotiation via N32-c.

In some embodiments, the following security related configuration parameters may be exchanged between the two SEPPs:

If PRINS without a profile is chosen:
a. Modification policy. A modification policy indicates which IEs can be modified by an IPX provider of the sending SEPP.
b. Data-type encryption policy. A data-type encryption policy indicates which types of data will be encrypted by the sending SEPP.
c. Cipher suites for confidentiality and integrity protection, when application layer security is used to protect HTTP messages between them.
d. N32-f context ID. The N32-f context ID identifies the set of security related configuration parameters applicable to a protected message received from a SEPP in a different PLMN.

If PRINS with a profile is chosen:
A PRINS profile indicating a predefined set of one or more of the above policies.

One or more of the following are to be negotiated for PRINS, and can be specified in the profiles. The profile may be regarded as a template.

In some embodiments, N32-f may use profiles with pre-populated parameters for cipher suite, modification policy and data encryption policy. This may be combined with a list of IEs to be protected. This may be combined with an indication of the trust level:

Cipher suites are used for confidentiality and integrity protection. Currently 128-bit ciphering and integrity algorithms are specified but it is envisaged that algorithms using more than 128 bits may be used. For example, algorithms using 256-bits or even more bits may be used. Some examples of cipher suites are NEA1, NEA2, NEA3, and NIA1, NIA2, NIA3 (or the null cipher suites respectively).

Modification policies may indicate which IEs can be modified by the IPX providers. This may include the removal or addition of new IEs. Out of a list of possible IEs, one or more IEs may be such that in general these should not be modifiable by the IPX providers. These may be for example the more critical IE elements.

For example, all IEs related to one or more of authentication vectors, location data and cryptographic material may be confidentiality protected between peer roaming operators, and put it in the security PRINS profile/template.

In some embodiments SUPI (Subscription Permanent Identifier) and authorization tokens IEs may be encrypted in one profile, and in clear text in another profile.

Data-type encryption policies—the PRINS profile may include the mandatory encryption of the IEs related to one or more of authentication vector, location data and cryptographic material.

The trust criteria may be based on predefined levels. For example this may be in FS.34 (a GSMA Permanent Reference Document (PRD) related to Key management for 4G and 5G Inter-PLMN Security). For example, the trust levels may be:

High trust—between peer operators with a roaming contract

Medium trust—MNO (mobile network operator) and IPX provider (messages managed by IPX provider on behalf of the MNO are MNO assets in any case)

Low trust—no contract in place

One example implementation is as follows:

If PRINS is chosen, full flexibility in negotiation is possible or one of a set of different PRINS profiles may be selected. The number of different profiles may be any suitable number. In this example, the profiles are referred to as profile A, profile B and so on. The profiles will be associated with one or more different parameters.

In some embodiments, the option to have fully flexible negotiation may not be provided.

In some embodiments, an operator may provide one or more operator defined profiles.

If a defined profile is used, this may avoid having to negotiate the protection profiles. Instead a default set of parameters associated with the selected profile are listed for protection/modification policies against IPX or RHUB (roaming hub).

One or more example profiles are as follows:

One PRINS profile may have a distinct set of parameters which are allowed to be modified by the IPX/RHUB.

Another PRINS profile may be associated with a different set of parameters.

Another PRINS profile—a "null" profile may be that there is no protection at the application layer (this may be possible in certain regulatory environments or by using also via N32-f transport layer security TLS). Thus, there may be security, but just at transport level. PRINS is about application layer security. N-32c is protected at a transport level, i.e. via TLS, and there the type of protection required may be selected—for example PRINS (higher level of security) or TLS.

Another PRINS profile may be for a particular operator.

In some embodiments, the "trust" indication may be used. This may give another dimension to the profile.

The following table gives some examples of the security capability which can be used on the N32 interface. Rows are provided for each PRINS option.

| Enumeration value | Description |
| --- | --- |
| "TLS" | TLS security. |
| "PRINS" | Protocol for N32 Interconnect Security-fully negotiable |
| "PRINS null" | |
| "PRINS A" | predefined PRINS profile A |
| "PRINS B" | predefined PRINS profile B |
| ... | ... |
| PRINS operator defined profile | Operator define profile |

The following table gives some examples of the security capability which can be used on the N32 interface where a sub-hierarchy is added to the PRINS row.

| Enumeration value | Description |
| --- | --- |
| "TLS" | TLS security. |
| "PRINS" | Protocol for N32 Interconnect Security with subcategories to indicate full usage of PRINS, or |
| --- full | |
| --- null | with no security or with profiles |
| --- profile A | |
| --- profile B | |
| --- ... | |
| --- operator defined profile | |

A Yaml document is provided as part of some standards. The Yaml document can be enhanced by stating for each of these profiles which IE Types are protected and which one are accessible.

IE Types listed in such Yaml document are as follows:
IeType:
  anyOf:
    type: string
    enum:
      UEID
      LOCATION
      KEY_MATERIAL
      AUTHENTICATION_MATERIAL
      AUTHORIZATION_TOKEN
      OTHER
      NONSENSITIVE
    type: string Depending on the profile there may be several standard profiles, for example "A" or "B", which detail by policy the IE Types to be encrypted or not. For the IE Types that are not encrypted, there may be an indication as to whether they are allowed to be modified.

With this information, during N32-c handshake, if the PRINS enhanced profile, e.g "B", is chosen, then both SEPPs (VPLMN and HPLMN) know how to handle the communication on the N32-f interface and the intermediary IPX providers as well.

The two SEPPs may perform the following cipher suite negotiation to agree on a cipher suite to use for protecting NF service related signalling over N32-f—this is without the use of the profiles. This option may be used when PRINS is to be used but one of the profiles is not used. This may for example be as set out in the 3GPP specification 29.573.

1a. The SEPP which initiated the first N32-c connection shall send a Security Parameter Exchange Request message to the responding SEPP including the initiating SEPP's supported cipher suites. The cipher suites shall be ordered in initiating SEPP's priority order. The SEPP shall provide an initiating SEPP's N32-f context ID for the responding SEPP.

1b. The responding SEPP shall compare the received cipher suites to its own supported cipher suites and shall select, based on its local policy, a cipher suite, which is supported by both initiating SEPP and responding SEPP.

1c. The responding SEPP shall send a security parameter exchange response message to the initiating SEPP including the selected cipher suite for protecting the NF service related signalling over N32. The responding SEPP shall provide a responding SEPP's N32-f context ID for the initiating SEPP.

2. The two SEPPs may perform the following exchange of data-type encryption policies and modification policies. Both SEPPs shall store protection policies sent by the peer SEPP.

2a. The SEPP which initiated the first N32-c connection shall send a security parameter exchange request message to the responding SEPP including the initiating SEPP's data-type encryption policies and Modification policies.

2b. The responding SEPP shall store the policies if sent by the initiating SEPP.

2c. The responding SEPP shall send a security parameter negotiation response message to the initiating SEPP with the responding SEPP's suite of protection policies.

2d. The initiating SEPP shall store the protection policy information if sent by the responding SEPP.

3. The two SEPPs shall exchange IPX security information lists that contain information on IPX public keys or certificates that are needed to verify IPX modifications at the receiving SEPP.

4. The two SEPPs shall export keying material from the TLS session established between them using the TLS export function. The exported key shall be used as the master key to derive session keys and IVs for the N32-f context.
5. The responding SEPP in the first N32-c connection shall now setup a second N32-c connection by establishing a mutually authenticated TLS connection with the peer SEPP.
6. The two SEPPs start exchanging NF to NF service related signalling over N32-f and may keep the TLS session open for any further N32-c communication that may occur over time while application layer security is applied to N32-f.

Some embodiments add an indication of profiles in the security capability negotiation procedure, where the supported capabilities are communicated, thus avoiding the burden of further negotiations. That means, the parameter exchange procedure can be executed automatically with predefined parameters for SEPP's data-type encryption policies and modification policies, i.e. defined in the profile.

Depending on the profile there may be several standard profiles, for example "A" or "B", which detail by policy the IE Types to be encrypted or not. For the IE Types that are not encrypted, there may be an indication as to whether they are allowed to be modified.

With this information, during N32-c handshake, if the PRINS enhanced profile, e.g "B", is chosen, then both SEPPs (VPLMN and HPLMN) know how to handle the communication on the N32-f interface and the intermediary IPX providers as well. Thus at the time that the mechanism to protect N-32f is selected, in addition to the current TLS or PRINS (such as described previously), there is also the option to select a PRINS profile from one or more PRINS profiles.

0a. The initiating SEPP initiates a security capability negotiation procedure towards the responding SEPP to agree on a security mechanism to use for protecting NF service related signalling over N32-f.
0b. The initiating SEPP provides the supported (or selected) security capability, i.e. PRINS, the PRINS profile, and/or TLS. The SEPP may provide a preference order for the list of the supported security capabilities. This may indicate for example that profile A is preferred but profile B is also supported.
0c. On successful processing of the request, the rSEPP responds back and provides the selected security capability among other information. The rSEPP compares the supported security capabilities to its own supported security capabilities and selects, based on its local policy, but in priority order, the security mechanism, which is supported by both the SEPPs. In other words, the rSEPP will check that it can support the requested PRINS profile.
0d. On failure the rSEPP responds with an error message.

The two SEPPs may perform via N32-c the following cipher suite negotiation to agree on a cipher suite to use for protecting NF service related signalling over N32-f—this may be performed if the PRINS profile selected does not include a cipher suite.

1a. The SEPP which initiated the N32-c connection, shall send a Security Parameter Exchange Request message to the responding SEPP including the initiating SEPP's supported cipher suites. The cipher suites shall be ordered in initiating SEPP's priority order. The SEPP shall provide an initiating SEPP's N32-f context ID for the responding SEPP.
1b. The responding SEPP shall compare the received cipher suites to its own supported cipher suites and shall select, based on its local policy, a cipher suite, which is supported by both initiating SEPP and responding SEPP.
1c. The responding SEPP shall send a security parameter exchange response message to the initiating SEPP including the selected cipher suite for protecting the NF service related signalling over N32-f. The responding SEPP shall provide a responding SEPP's N32-f context ID for the initiating SEPP.
2. The two SEPPs may know from the chosen profile how to prepare the data exchange of data-type encryption policies and modification policies. Both SEPPs shall store protection policies sent by the peer SEPP.
3. The two SEPPs shall exchange IPX security information lists that contain information on IPX public keys or certificates that are needed to verify IPX modifications at the receiving SEPP.
4. The two SEPPs shall export keying material from the TLS session established between them using the TLS export function. The exported key shall be used as the master key to derive session keys and IVs for the N32-f context.
5. The responding SEPP in the first N32-c connection shall now setup a second N32-c connection by establishing a mutually authenticated TLS connection with the peer SEPP.
6. The two SEPPs start exchanging NF to NF service related signaling over N32-f and may keep the TLS session open for any further N32-c communication that may occur over time while application layer security is applied to N32-f. The JOSE (Javascript Object Signing and Encryption) protected message forwarding procedure on N32-f is via IPX providers. An indication which PRINS/template (profile) the SEPPs have negotiated via N32-c is provided that allows any intermediary node to process a passing message accordingly.

The JOSE protected forwarding option is used by the sending SEPP or IPX to discover the communication options supported by its next hop (IPX or SEPP) for N32-f message processing. The options request sent by SEPP or IPX to discover the communications options supported may include the PRINS option indication negotiated by the SEPPs.

In some embodiments, a N32-c initial handshake establishes session keys, IVs and negotiated cipher suites. Counters are used for replay protection. Modification policies are identified by modification policy IDs, to be able to verify received messages that have undergone IPX modifications.

The N32-f security context may comprise one or more of the following parameters:
Session keys
Negotiated cipher suites
Data type encryption policy IDs
Modification policy list (if IPXs are used)
Modification policy IDs
IPX provider identifier
Counters
IVs
List of security information of the IPX providers connected to the SEPPs (IPX security information list)
IPX provider identifier
List of raw public keys or certificates for that IPX.

It should be appreciated that where a PRINS profiles is used, the PRINS profile is provided as a parameter and the parameters relating to data type encryption policy IDs, the modification policy list (if IPXs are used) and modification policy IDs may be omitted as information on these parameters is indicated by the PRINS profile.

In some embodiments, the N32-f context information may comprise the following parameters:

Validity.

Usage (PRINS).

In some embodiments, the usage may indicate which PRINS profile is used.

FIG. 4 shows a schematic representation of non-volatile memory media 800a (e.g. computer disc (CD) or digital versatile disc (DVD)) and 800b (e.g. universal serial bus (USB) memory stick) storing instructions and/or parameters 802 which when executed by a processor allow the processor to perform one or more of the steps of the methods of FIG. 5 or 6.

Reference is made to FIG. 5 which shows a method. The method may be performed by an apparatus. This apparatus may be as described in relation to FIG. 2. The apparatus may be provided by or in a security node.

The method may comprise in step A1, causing information indicating a first security protocol profile of a first security protocol from a first security node of a first network to be sent from a first security node of a first network to a second security node of a second network, wherein the first security profile has one or more of: a modification policy; a data type policy; and a cipher suite.

The method may comprise in step A2 causing the first security node to communicate with the second security node in accordance with the first security profile.

Reference is made to FIG. 6 which shows a method. The method may be performed by an apparatus. This apparatus may be as described in relation to FIG. 2. The apparatus may be provided by or in a security node.

The method may comprise in step B1 receiving information indicating a first security protocol profile of a first security protocol from a first security node of a first network, wherein the first security profile has one or more of: a modification policy; a data type policy; and a cipher suite. The method may comprise in step B1 causing a second security node of a second network to communicate with the first security node in accordance with the selected security profile.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems. It should be appreciated that the 5G networks shown are by way of example only and one or more of the functions shown may be omitted and/or one or more different functions may be provided.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 5 or 6, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the security node or IPEX node.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus configured to protect communications between a first network and a second network, the apparatus being a first security node of the first network and comprising:
   at least one processor; and
   at least one memory including computer program code, the at least one memory and the computer program code being configured to, with the at least one processor, cause the apparatus at least to:
   cause, when a first security mechanism is selected to protect communications between the first security node and a second security node of the second network, information indicating one or more predefined security profiles to be sent towards the second security node in a security parameter exchange request of a parameter exchange procedure, wherein a predefined security profile of the one or more predefined security profiles includes pre-populated parameters for a modification policy and a data type encryption policy; and
   cause the first security node to communicate with the second security node in accordance with one or more selected security profiles selected from the one or more predefined security profiles.

2. The apparatus as claimed in claim 1, wherein the security parameter exchange request includes an information element that indicates a list of the one or more predefined security profiles supported by the first security node for the first security mechanism.

3. The apparatus as claimed in claim 2, wherein the at least one memory and the computer program code are configured to, with the at least one processor, cause the apparatus at least to receive a security parameter exchange response of the parameter exchange procedure from the second security node indicating the one or more selected security profiles selected by the second security node.

4. The apparatus as claimed in claim 3, wherein the security parameter exchange response includes an information element that indicates a list of the one or more selected security profiles selected by the second security node.

5. The apparatus as claimed in claim 1, wherein the at least one memory and the computer program code are configured to, with the at least one processor, cause the apparatus at least to receive information indicating which of the one or more predefined security profiles are supported by the second security node.

6. The apparatus as claimed in claim 1, wherein the at least one memory and the computer program code are configured to, with the at least one processor, cause the apparatus at least to, prior to causing information indicating the one or more predefined security profiles to be sent, receive information indicating which of the one or more predefined security profiles are supported by the second security node.

7. The apparatus as claimed in claim 1, wherein the first security mechanism comprises a protocol for N32 interconnect security (PRINS).

8. The apparatus as claimed in claim 1, wherein the at least one memory and the computer program code are configured to, with the at least one processor, cause the apparatus at least to provide information indicating the one or more selected security profiles to one or more intermediate internet protocol exchange service nodes.

9. The apparatus as claimed in claim 1, wherein the predefined security profile of the one or more predefined security profiles includes:
   a default modification policy;
   a default data type encryption policy and list of information elements to be protected; and
   a preselected cipher suite.

10. The apparatus as claimed in claim 1, wherein the at least one memory and the computer program code are configured to, with the at least one processor, cause the apparatus at least to cause information indicating support of security profiles by the first security node to be sent to the second security node during a security capability negotiation procedure.

11. An apparatus configured to protect communications between a first network and a second network, the apparatus being a second security node of the second network and comprising:
    at least one processor; and
    at least one memory including computer program code, the at least one memory and the computer program code being configured to, with the at least one processor, cause the apparatus at least to:
    receive, when a first security mechanism is selected to protect communications between a first security node of the first network and the second security node, information indicating one or more predefined security profiles from the first security node in a security parameter exchange request of a parameter exchange procedure, wherein a predefined security profile of the one or more predefined security profiles includes pre-populated parameters for a modification policy and a data type encryption policy;
    select one or more selected security profiles from the one or more predefined security profiles; and
    cause the second security node to communicate with the first security node in accordance with the one or more selected security profiles.

12. The apparatus as claimed in claim 11, wherein the security parameter exchange request includes an information element that indicates a candidate list of the one or more predefined security profiles supported by the first security node for the first security mechanism.

13. The apparatus as claimed in claim 12, wherein the at least one memory and the computer program code are configured to, with the at least one processor, cause the apparatus at least to cause information indicating the one or more selected security profiles to be sent towards the first security node in a security parameter exchange response of the parameter exchange procedure.

14. The apparatus as claimed in claim 13, wherein the security parameter exchange response includes an information element that indicates a list of the one or more selected security profiles selected by the second security node.

15. The apparatus as claimed in claim 11, wherein the first security mechanism comprises a protocol for N32 interconnect security (PRINS).

16. A method comprising:
    causing, when a first security mechanism is selected to protect communications between a first security node of a first network and a second security node of a second network, information indicating one or more predefined security profiles to be sent from the first security node towards the second security node in a security parameter exchange request of a parameter exchange procedure, wherein a predefined security profile of the one or more predefined security profiles includes pre-populated parameters for one or more of: a modification policy and a data type encryption policy; and causing the first security node to communicate with the second security node in accordance with one or more selected security profiles selected from the one or more predefined security profiles.

17. The method as claimed in claim 16, wherein the security parameter exchange request includes an information element that indicates a list of the one or more predefined security profiles supported by the first security node for the first security mechanism.

18. The method as claimed in claim 17, further comprising:

receiving, at the first security node, a security parameter exchange response of the parameter exchange procedure from the second security node indicating the one or more selected security profiles selected by the second security node.

19. The method as claimed in claim 18, wherein the security parameter exchange response includes an information element that indicates a list of the one or more selected security profiles selected by the second security node.

20. A method comprising:

receiving, when a first security mechanism is selected to protect communications between a first security node of the first network and the second security node of a second network, information indicating one or more predefined security profiles at the second security node sent by the first security node in a security parameter exchange request of a parameter exchange procedure, wherein a predefined security profile of the one or more predefined security profiles includes pre-populated parameters for a modification policy and a data type encryption policy;

selecting, at the second security node, one or more selected security profiles from the one or more predefined security profiles; and causing the second security node to communicate with the first security node in accordance with the one or more selected security profiles.

* * * * *